United States Patent [19]
Takahashi

[11] Patent Number: 4,993,699
[45] Date of Patent: Feb. 19, 1991

[54] REVERSIBLE AUTO DOCUMENT FEEDER
[75] Inventor: Masanobu Takahashi, Suita, Japan
[73] Assignee: Mita Industrial Co., Ltd., Osaka, Japan
[21] Appl. No.: 243,578
[22] Filed: Sep. 13, 1988
[30] Foreign Application Priority Data
Sep. 19, 1987 [JP] Japan .............................. 62-235777
[51] Int. Cl.⁵ ............................................ B65H 29/20
[52] U.S. Cl. .................................. 271/186; 271/291; 271/902
[58] Field of Search .............. 271/291, 902, 301, 186, 271/3.1

[56] References Cited
U.S. PATENT DOCUMENTS

| 4,412,740 | 11/1983 | Buddendeck | 271/902 X |
| 4,419,007 | 12/1983 | Kingsley | 271/902 X |
| 4,456,236 | 6/1984 | Buddendeck | 271/291 X |
| 4,544,148 | 10/1985 | Kitajima | 271/291 X |
| 4,579,326 | 4/1986 | Pinckney | 271/291 X |
| 4,632,376 | 12/1986 | DuBois | 271/902 X |

Primary Examiner—Richard A. Schacher
Attorney, Agent, or Firm—Jordan and Hamburg

[57] ABSTRACT

A reversible auto document feeder having a document feeding mechanism for feeding a document to a document placing position of an image forming apparatus, reversing the document, feeding the reversed document to the document placing position again, and discharging the document is provided with change means for changing to another control mode of controlling the document feeding mechanism so as to feed a document to the document placing position, reversing the document after copying, feeding the reversed document to the document placing position again, and discharging the document after copying in accordance with an ADF signal from the image forming apparatus. Consequently, even if attached to image forming apparatus capable of sending only an ADF signal, RADF operation can be performed in accordance with the ADF signal.

2 Claims, 8 Drawing Sheets

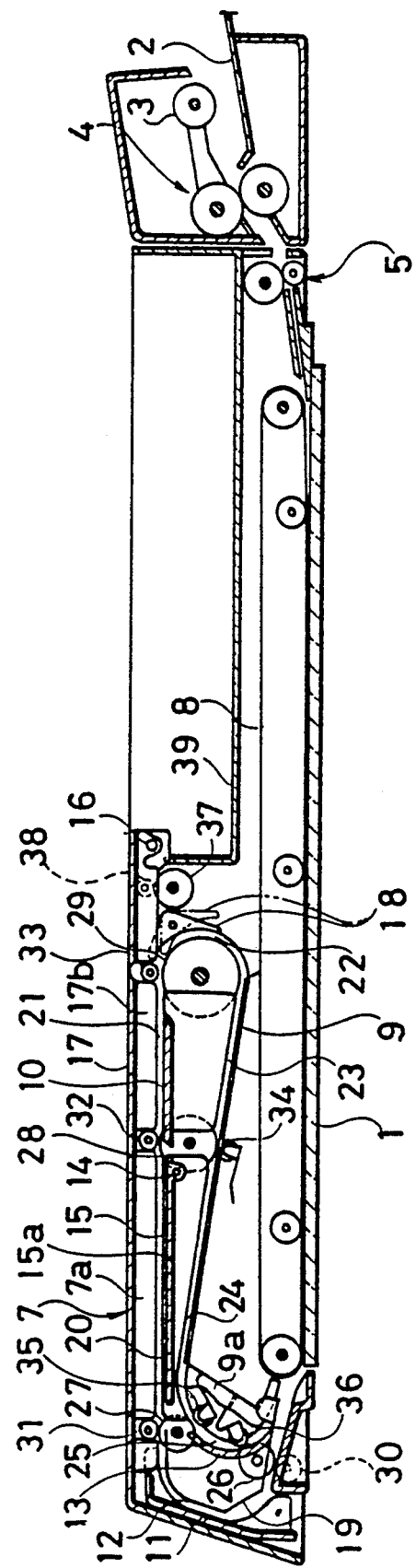

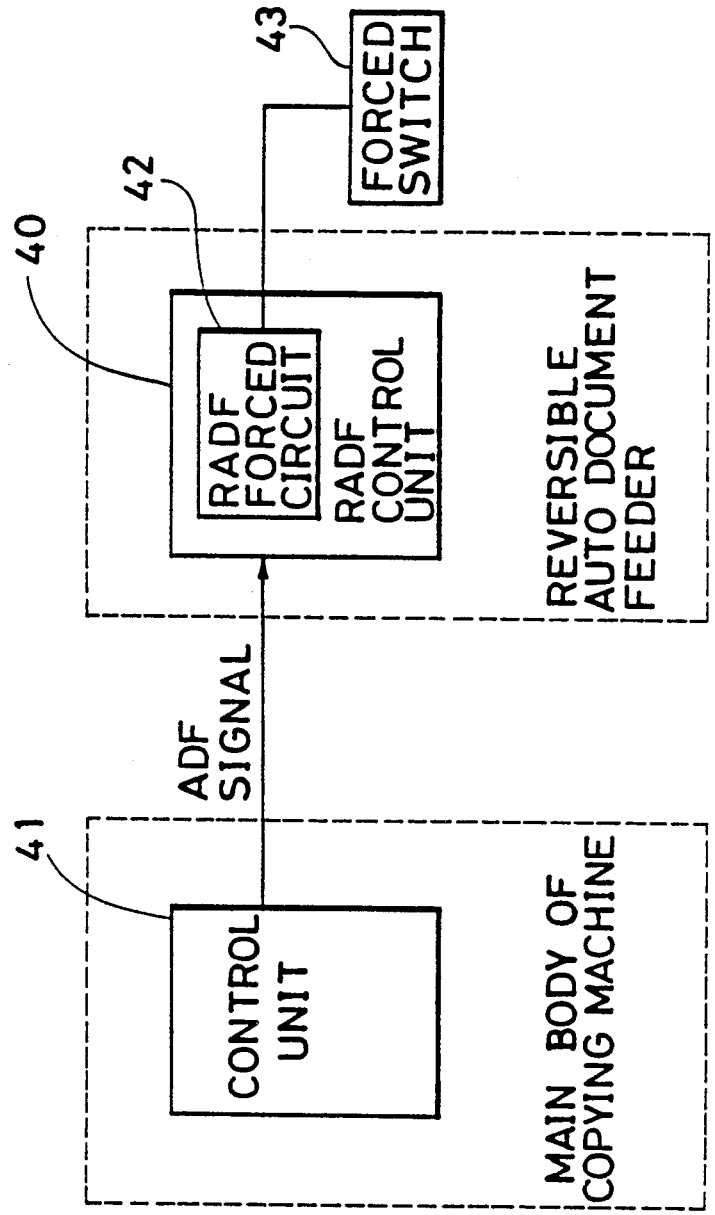

START — ADF START

CONTINUING — CHANGE

DISCHARGING — CHANGE

START

ADF START

REVERSING

CHANGE

CONTINUING

CHANGE

DISCHARGING

CHANGE

START

REVERSING

CONTINUING B

DISCHARGING

REVERSIBLE AUTO DOCUMENT FEEDER

BACKGROUND OF THE INVENTION AND RELATED ART STATEMENT

This invention relates to a reversible auto document feeder for use in image forming apparatus, such as copying machines and facsimile terminals, which makes it possible to reverse a document.

Image forming apparatus carrying an auto document feeder have been widely used more and more. Recently there has also been provided a reversible auto document feeder which, in addition to the conventional function of feeding a document automatically, makes it possible to automatically reverse a document so as to copy images on its both sides by a simple operation.

The above-mentioned reversible auto document feeder is so designed that it operates in response to signals from a main body of an image forming apparatus. Specifically, when the reversible auto document feeder receives a signal for auto document feeding (referred to as ADF hereinafter) from the main body, it feeds a document to a document placing position and then discharges the document after copying. When the reversible auto document feeder receives a signal for reversible auto document feeding (referred to as RADF hereinafter) from the main body, it feeds a document to the document placing position, then reverses the document, feeding the document to the document placing position again, and finally discharging it. In this way, the operation of a conventional reversible auto document feeder is unilaterally determined by signals from a main body of an image forming apparatus. In other words, it is determined by signals from the main body which of ADF and RADF the feeder executes.

In image forming apparatus which are currently available, there is one having a function of forming images on both sides of copying paper (hereinafter referred to as a double-side machine) and another not having such a function (hereinafter referred to as a single-side machine). The double-side machine is constructed so as to send both ADF and RADF signals. Accordingly, the double-side machine which is equipped with a reversible auto document feeder can perform the following functions:

(1) Forming images of a double-sided document on both sides of copying paper
(2) Forming images of a double-sided document on one side of copying paper
(3) Forming an image of a single-sided document on both sides of copying paper
(4) Forming an image of a single-sided document on one side of copying paper Also, it will be theoretically seen that the single-side machine which is equipped with a reversible auto document feeder can perform (2) and (4) of the above-mentioned functions.

However, the single-side machine sends only an ADF signal. On the other hand, with a conventional reversible auto document feeder, its operation is determined by a signal from the main body of the image forming apparatus as described above. Consequently, even if such a conventional reversible auto document feeder is attached to the single-side machine, only function (4) can be performed. Thus, conventional reversible auto document feeders have not fully performed its function.

An auto document feeder capable of reversible auto document feeding is found in Japanese Unexamined Patent Publication No. 62-180829. It should be noted that a reversible auto document feeder of the above invention is applied only for image forming apparatus, whose main body sends a RADF signal.

SUMMARY OF THE INVENTION

It is an object of the present invention to provide a reversible auto document feeder which is able to perform reversible auto document feeding even in the case when the main body of the image forming apparatus sends only ADF signals and is thus able to fully perform its function.

Accordingly, a reversible auto document feeder of the present invention comprises a mechanism for feeding a document to a document placing position of an image forming apparatus, reversing the document, feeding the reversed document to the document placing position again, discharging the document, and control means for controlling operation of the document feeding mechanism so as to feed a document to the document placing position, reversing the document, feeding the reversed document to the document placing position again, and discharging the document in accordance with an ADF signal from the image forming apparatus.

It is another object of the present invention to provide a reversible auto document feeder which is able to selectably perform auto document feeding and reversible auto document feeding in accordance with an ADF signal from the image forming apparatus.

Accordingly, a reversible auto document feeder of the present invention is so constructed as to perform auto document feeding in addition to reversible auto document feeding in accordance with an ADF signal from the image forming apparatus.

BRIEF DESCRIPTION OF THE DRAWINGS

FIG. 1 is a sectional view of a reversible auto document feeder of the present invention;

FIG. 2 is a block diagram showing a control unit of the reversible auto document feeder;

DETAILED DESCRIPTION OF THE PREFERRED EMBODIMENTS OF THE INVENTION

Figure 3A:
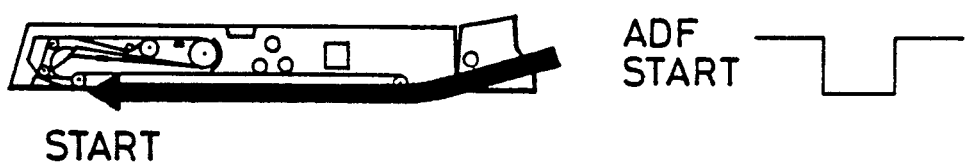
FIGS. 3 (a), 3 (b), 3 (c) are views showing operation of ADF mode of the reversible auto document feeder.

FIG. 1 shows an internal mechanism of a reversible auto document feeder of the present invention. As described below, the reversible auto document feeder includes a document feeding mechanism which, in addition to the functions of feeding a document to a contact glass 1 or document placing position of a copying machine or image forming apparatus and discharging the document, has a function of reversing the document and feeding it to the contact glass 1 again.

Referring to the figure, above a document tray 2 on which a document is to be placed is provided a roller 3 which comes into contact with the document. On the downstream side of the document tray 2 are provided two pairs of feed rollers 4 and 5. Above the contact glass 1 is provided a conveyor belt 8. On the downstream side of the conveyor belt 8 is provided a document reversing mechanism 7 for reversing a document.

The document reversing mechanism 7 comprises guide members 9, 10 and guide plates 11, 12. 13 fixedly attached to a main body, a guide plate 15 attached to the main body, the guide plate 15 being rotatable about a shaft 14, a cover 17 attached to the main body, the cover 17 being rotatable about a shaft 16, and a changing guide plate 18.

The guide plates 11 and 12 forms a passage 19. A rib 17a of the cover 17 and a top surface of the rotatable guide plate 15 form a passage 20. A rib 17b of the cover 17 and the guide member 10 form a passage 21. The changing guide plate 18 forms a passage 22. The guide members 9 and 10 form a passage 23. A rib 15a of the rotatable guide plate 15 and the guide member 9 form a passage 24. The guide plate 13 and a rib 9a of the guide member 9 form a passage 25.

On the upstream side of the passage 19 are provided a conveying roller 26 and a roller 30 attached to the main body of image forming apparatus. On the upstream side of the passage 20 are provided a conveying roller 27 and a roller 31. On the upstream side of the passage 21 are provided a conveying roller 28 and a roller 32. On the upstream side of the passage 22 are provided a return conveying roller 29 and a roller 33. On the upstream side of the passage 24 are provided the conveying roller 28 and a roller 34. On the upstream side of the passage 25 are provided the conveying roller 27 and a roller 35. The rollers of each of the pairs are in pressure contact with each other. The conveying roller 26 is in pressure contact with a roller 36 in the passage 20. Rotating the conveying rollers 26, 27, 28, 29 causes the rollers 30, 31, 32, 33, 34, 35, 36 to synchronously rotate, so that a document is conveyed through the passages 19, 20, 21, 22, 23, 24 and 25 in sequence.

The changing guide plate 18 is changed from a position indicated by solid lines in FIG.1 to a position indicated by two-dot chain lines and vice versa. When set at the position indicated bY solid lines, the guide plate 18 forms the passage 22 in combination with the return conveying roller 29. When set at the position indicated by two-dot chain lines, the guide plate 18 forms a document discharge passage in combination with the cover 17. On the downstream side of the document discharge passage are provided a discharge roller 37 and a roller 38. Further downstream there is provided a discharge tray 39.

As shown in FIG. 2, the reversible auto document feeder is provided with a control unit (control means) 40 for controlling operation of the above-mentioned mechanisms. The control unit 40 receives a signal from a control unit 41 of the main body of the copying machine. The control unit 41 of the main body of the copying machine sends only a signal for ADF and no signal for RADF.

The control unit 40 of the reversible auto document feeder is provided with a RADF forced circuit 42. To the RADF forced circuit 42 is connected a forced switch 43 or changing means provided outside the reversible auto document feeder.

Figure 3B:
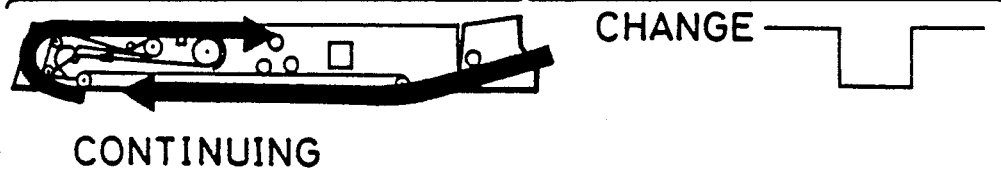
Figure 3C:
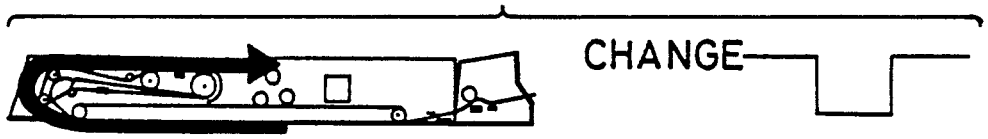
Figure 4A:
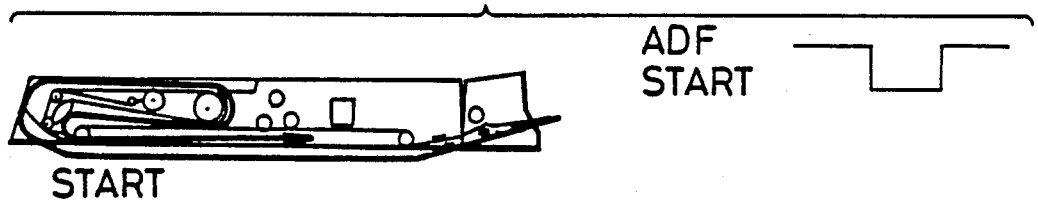
FIGS. 4 (a), 4 (b), 4 (c), 4 (d) are views showing operation of RADF mode of reversible auto document feeder.
Figure 4B:
Figure 4C:
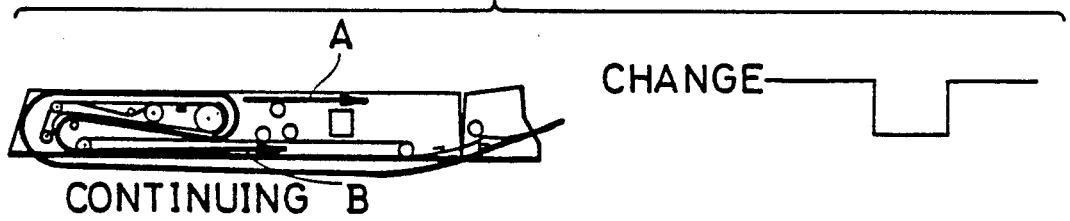
Figure 4D:

The control unit 40, when set in a normal mode, controls the mechanisms so that the reversible auto document feeder performs ADF as illustrated in FIG. 3 in accordance with an ADF signal from the main bodY of the copying machine, specifically, so that the feeder feeds a document to the contact glass 1 and then discharges it. When changed to RADF mode by the RADF forced circuit 42, the control unit 40 controls the mechanisms so that the reversible auto document feeder performs RADF as illustrated in FIG.4 in accordance with an ADF signal, specifically, so that the feeder feeds a reversed document to the contact glass 1, reversing the document again, feeding the document to the contact glass 1, and discharging it. It should be noted that in the normal mode, when receiving a RADF signal from the main body, the control unit 40 controls the mechanisms so that the reversible auto document feeder performs RADF. In other words, when a main body of the image forming apparatus is used which sends both ADF and RADF signals, by setting the control unit 40 in the normal mode, the reversible auto document feeder can perform ADF or RADF in accordance with output signals from the main body.

The control mode change is performed by turning on and off the forced switch 43. When the forced switch 43 is turned on, the RADF forced circuit 42 changes the control unit 40 from the normal mode to the RADF mode.

Figure 5:
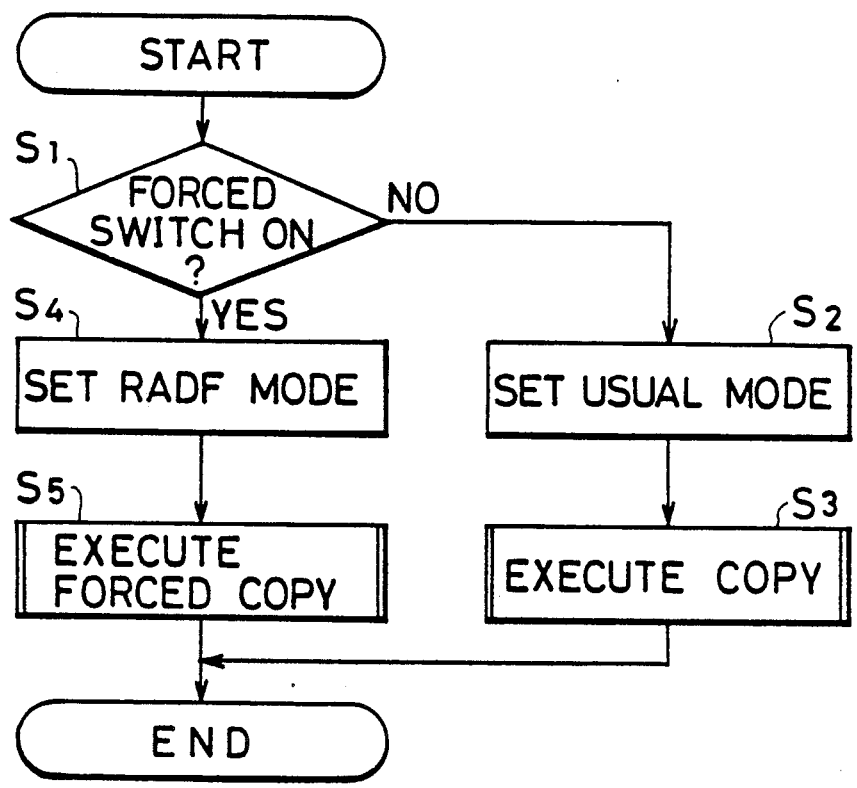
FIG. 5 is a flow chart showing control operation of a RADF control unit.

Specifically, the control unit 40 controls the mechanisms according to a flow chart shown in FIG.5.

Before starting a copying operation, it is checked whether the forced switch 43 is turned on (Step $S_1$). When the forced switch 43 is not turned on, the control unit 40 is set in the normal mode (Step $S_2$). Copying operation is then performed (Step $S_3$). In other words, in this flow, the reversible auto document feeder performs ADF in accordance with an ADF signal from the main body of the copying machine.

The actual operation of the normal mode of the reversible auto document feeder will be described with reference to FIGS.1 and 3. Firstly, a copy starting button is turned on. Consequently, the main body of the copying machine sends an ADF starting signal, so that the roller 3 comes into contact with a surface of the top document of a stack of documents to feed the top document as shown in FIG.3 (a). This document is then fed by the feed rollers 4, 5 to the conveyor belt 8. The conveyor belt 8 conveys the document to a predetermined position of the contact glass 1 and comes to a stop. With the document placed at the position, copying operation is performed.

After the copying operation is completed, as shown in FIG.3 (b), the main body sends an ADF change signal, so that the conveyor belt 8 is placed into work again to convey the document to the document reversing mechanism 7. At this time, the change guide plate 18 has already been changed to to the position indicated by two-dot chain lines in FIG.1. Accordingly, the document is conveyed through the passages 19, 20 and 21 in sequence, finally being discharged to the discharge tray 39 by the discharge roller 37 and the roller 38. Simultaneously, the next document is fed to the contact glass 1 in the same manner as above. In this way, the reversible auto document feeder repeats this operation every time it receives the above-mentioned change signal until it feeds the last document. Thereafter, the reversible auto document feeder which receives the last change signal performs only discharging of the document as shown in FIG.3 (c). Whether a document is the last one is determined by detecting the absence of a document by means of a document detecting switch (not illustrated) provided in the document tray 2.

At Step $S_1$ of FIG.5, on the other hand, when the forced switch 43 is turned on, the control unit 40 is set in the RADF mode (Step $S_4$). Consequently, although receiving an ADF signal from the main body of the copying machine, the control unit 40 controls the mechanisms so that the reversible auto document feeder forcedly performs RADF in accordance with the ADF signal (Step $S_5$).

Figure 6:
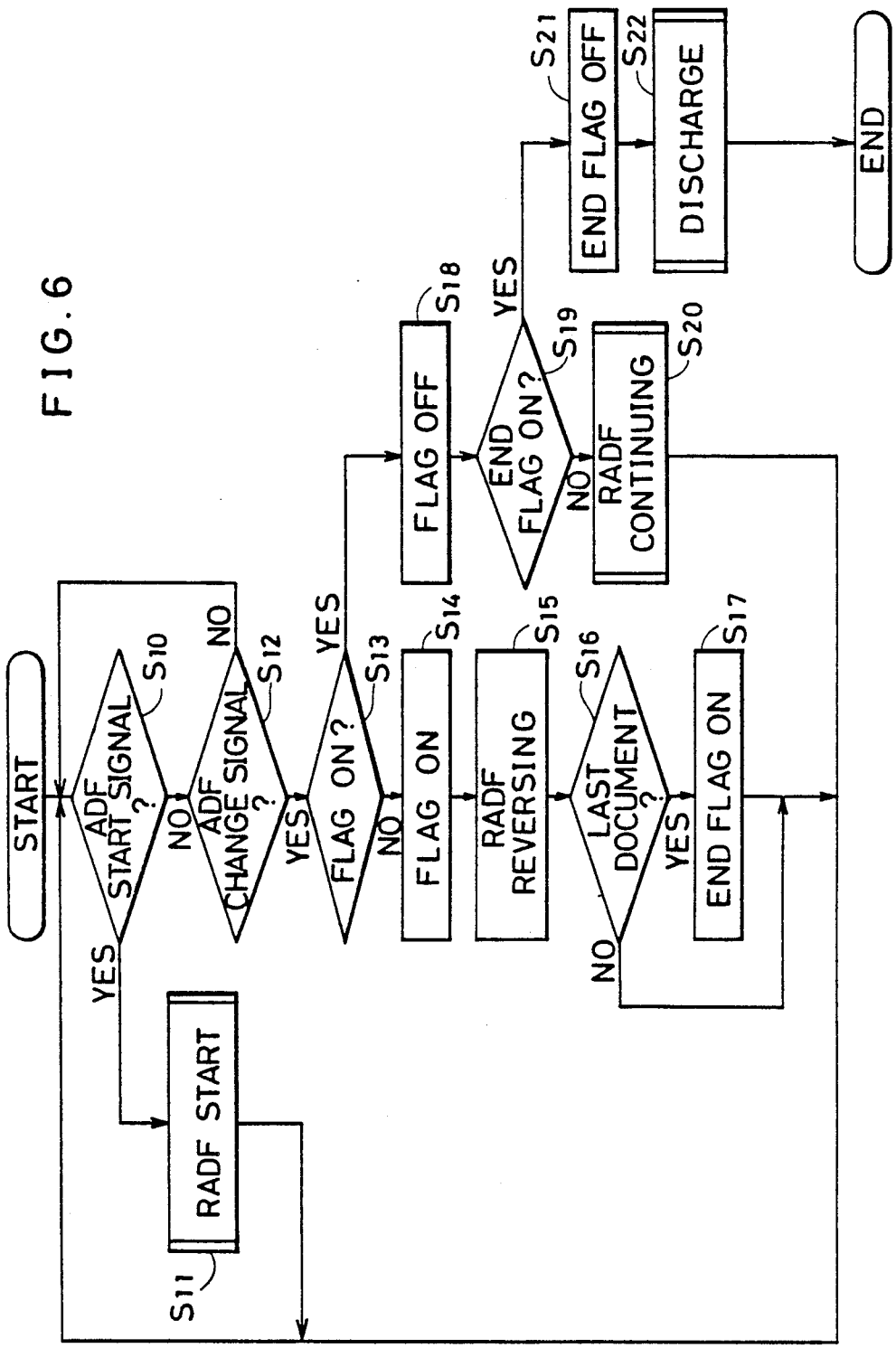
FIG. 6 is a flow chart showing RADF operation of the RADF control unit.

The RADF operation of the reversible auto document feeder will be described with reference to FIGS. 1 and 4 according to a flow chart shown in FIG.6.

When the copy starting button is turned on, the main body of the copying machine sends an ADF starting signal (the determination of Step $S_{10}$ is YES),as shown in FIG.4 (a), the RADF control unit 40 sends a RADF starting signal to start the RADF mode (Step $S_{11}$). Specifically, when the RADF control unit 40 receives the ADF starting signal, the reversible auto document feeder conveys the top document of a stack of documents to the conveyor belt 8 in the same manner as described above, further conveying the document to the document reversing mechanism 7 without stopping it over the contact glass At this time, the change guide plate 18 has been changed to the position indicated by solid lines in FIG.1. The document is conveyed through the passages 19, 20, 21, 22, 23, 24 and 25 in sequence to the conveyor belt 8. The conveyor belt 8 has already been changed so as to move in the opposite direction. Accordingly, the document is fed in the reverse direction. In other words, the document is reversed by the document reversing passages. Consequently, the document is conveyed in a reversed state to the contact glass 1. A back surface of the document is first copied. This corresponds to an operation illustrated in FIG.4 (a).

When the copying of the back surface is completed, the main body of the copying machine sends a first ADF change signal (NO at Step $S_{10}$, YES at Step $S_{12}$). When receiving the first ADF change signal, the RADF control unit 40 checks the state of a flag. The flag is used for alternately changing the reversible auto document feeder from an operation illustrated in FIG.4 (b) to one in FIG.4 (c) or vice versa, which will be described later. At the time of starting copying, the flag is set in an OFF-state at Steps $S_{17}$ and $S_{18}$. Accordingly, the RADF control unit 40 confirms that the flag is in OFF-state (NO at Step $S_{13}$), changing the flag to an ON-state (Step $S_{14}$), and executing reversing operation of RADF (Step $S_{15}$). Specifically, when receiving the first ADF change signal, the RADF control unit 40 actuates the conveyor belt 8 again, so that the document is conveyed to the document reversing mechanism 7. Further, the document is passed through the document reversing passages, then being conveyed to the contact glass 1 by the conveyor belt 8 driven in the opposite direction in the same manner as described above. Thereafter, the front surface of the document is copied. This corresponds to an operation illustrated in FIG. 4 (b).

After each copying of the front surface is completed, the above-mentioned document detecting switch detects the absence of a document. When the switch detects the absence of a document, the RADF control unit 40 determines that a document being copied at the present time is the last one (YES at Step $S_{16}$) and then sets an end flag in ON-state (Step $S_{17}$). As a result, when receiving the next ADF change signal, the RADF control unit 40 sets both the flag and the end flag in OFF-state at Steps $S_{18}$ and $S_{21}$. Sequentially, the document is discharged at Step $S_{22}$. This corresponds to an operation illustrated in FIG.4 (d).

On the other hand, when a document is not the last one (NO at Step $S_{16}$), the flag is in an ON-state (YES at Step $S_{13}$) and the end-flag is in an OFF-state (NO at Step $S_{19}$). Accordingly, when receiving the next ADF change signal, the RADF control unit 40 sets the flag in an OFF-state at Step $S_{18}$ and executes continuous operation of RADF which is different from the operation illustrated in FIG.4 (b). Specifically, when the RADF control unit 40 receives an ADF change signal, it allows the conveyor belt 6 to operate in the same manner as described above. At this time, however, the change guide plate 18 has been changed to the position indicated by two-dot chain lines in FIG.1. Accordingly, an document conveyed to the document reversing mechanism 7 is discharged to the discharge tray 39 while the next document is conveyed in the reversed state to the contact glass 1 as illustrated FIG.4 (a). This corresponds to an operation illustrated in FIG.4 (c).

Thereafter, each time the RADF control unit receives an ADF change signal, the RADF control unit sets the flag in an ON-state and an OFF-state alternately so that the reversible auto document feeder alternately performs the reversing operation illustrated in FIG.4 (b) and the continous operation illustrated in FIG.4 (c).

As mentioned above, this operation is repeated until the last document is copied (YES at Step $S_{16}$). Specifically, when the RADF control unit receives an ADF change signal after executing the two operations alternately until the last document is fed, the reversible auto document feeder performs only discharging of the last document as described above. This corresponds to the operation illustrated in FIG.4 (d).

The above-described reversible auto document feeder of the present invention is controlled by software as it is called. The present invention, however, makes it possible to execute the same control by a hardware circuit, which is described in the following embodiment.

Figure 7:
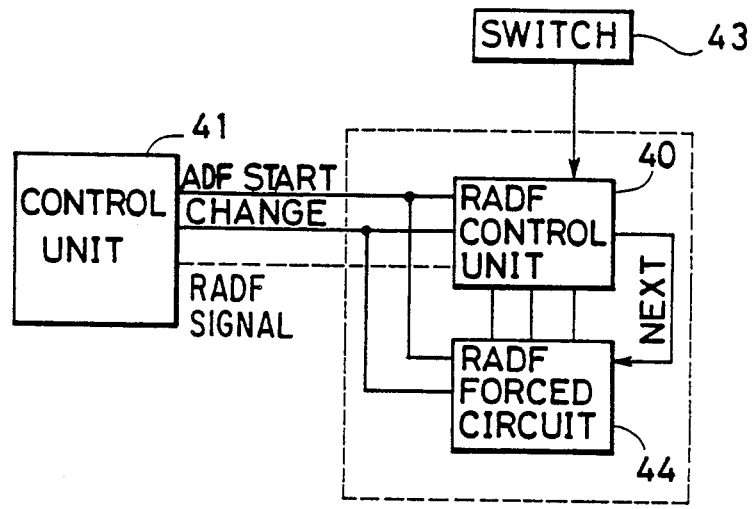
FIG. 7 is a block diagram showing a control unit of another reversible auto document feeder, the control unit including a hardware circuit.

FIG.7 is a block diagram showing a hardware circuit of the present invention.

In the diagram, a control unit 41 of a main body of a copying machine is so designed as to send an ADF control signal to a RADF control unit 40 and a RADF forced circuit 44. The ADF control signal is sent according to the turning on of a copy starting button and the completion of the copying operation.

The RADF control unit 40 controls the operation of mechanisms of an reversible auto document feeder. The RADF forced circuit 44 being made up of an electric circuit to transform an ADF control signal sent from control unit 41 into a RADF control signal, which will be described later.

To the RADF control unit 40 is connected a forced switch 43 provided outside the reversible auto document feeder. The forced switch 43 is turned on and off so as to change from an ADF mode to RADF mode vice versa. Specifically, when the forced switch 43 is turned on, the RADF control unit 40 is made to receive an RADF signal issued by the RADF forced circuit 44 instead of signals from the control unit 41. Alternately, when the forced switch 43 is turned off, the RADF control unit is made to directly receive only the signals from the control unit 41.

ADF control signals sent from the control unit 41 consist of an ADF starting signal for starting document feeding (ADF. START) and an ADF change signal for discharging a document (CHANGE). On the other hand, the RADF control signals formed in the RADF forced circuit 44 and sent to the RADF control unit 40 consist of an ADF starting signal, change signal, and RADF signal.

In addition, a signal for indicating whether a document is the last one is sent from the RADF control unit 40 to the RADF forced circuit 44. Although not illustrated in the diagram, this signal is also sent to the control unit 41 of the main body to control the copying operation of the main body.

It should be noted in the diagram that the third line (indicated by broken lines) sent from the control the unit 41 to the RADF control unit 40 represents output of a RADF signal from the control unit 41 itself of the main body of the copying machine. In this case, the RADF control unit 40 directly receives only a signal from the control unit 41 so as to operate the reversible auto document feeder in RADF mode.

Figure 8:
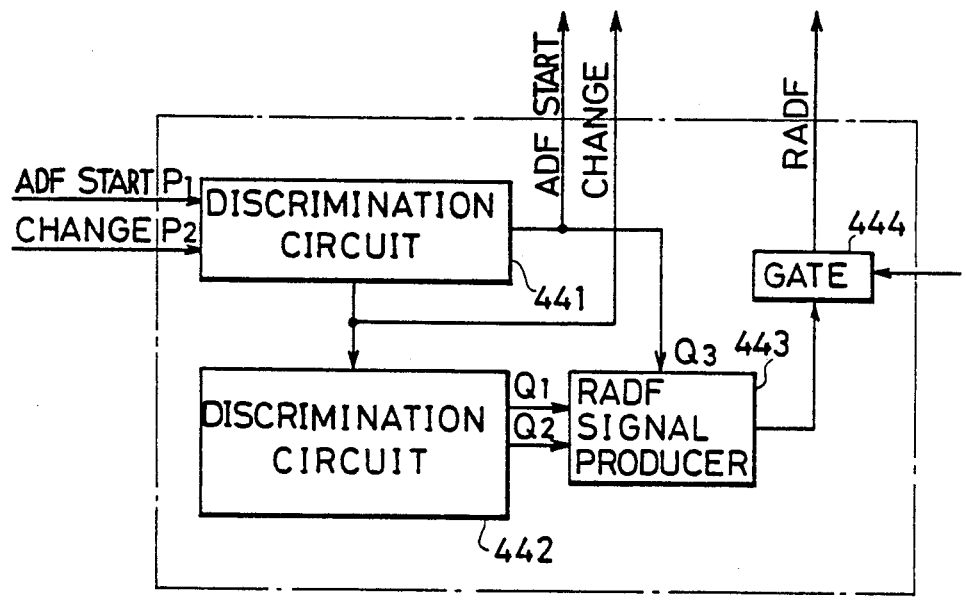
FIG. 8 is a detailed construction view of a RADF forced circuit shown in FIG. 7.
Figure 9A:
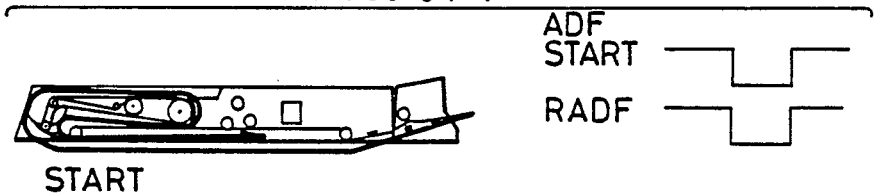
FIGS. 9 (a), 9 (b), 9 (c), 9 (d) are views showing operation of RADF mode of the reversible auto document feeder of FIG. 7.
Figure 9B:
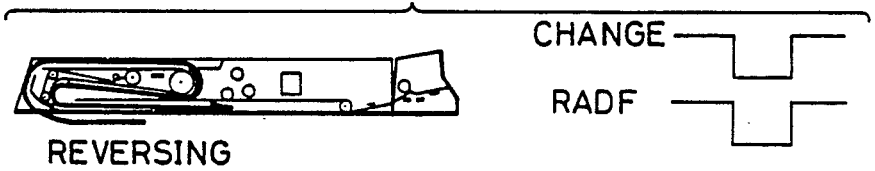
Figure 9C:
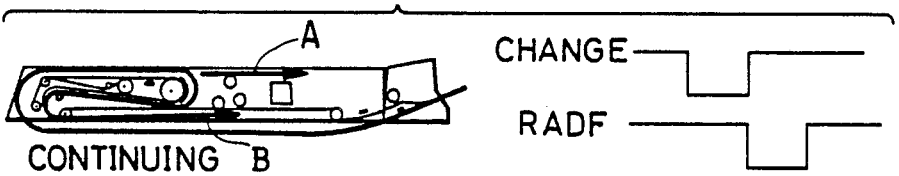
Figure 9D:
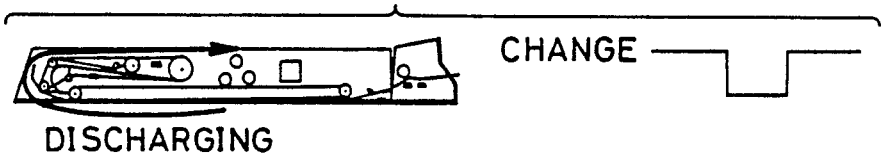

FIG.8 shows a construction of the RADF forced circuit 44 in detail. In the figure, a discrimination circuit 441 which has an input terminal $P_1$ for an ADF starting signal from the control unit 41 and an input terminal $P_2$ for an ADF change signal from the control unit 41 discriminates the ADF starting signal and the ADF change signal from each other to send them to their respective lines. The ADF starting signal issued just after the turning on of a copy starting button is sent to the "ADF.START" line and an input terminal $Q_3$ of a RADF signal producer 443, which will be described later. The ADF change signal is sent to the "CHANGE" line and the next stage discrimination circuit 442.

The discrimination circuit 442 judges whether an ADF change signal is first or second, that is, an odd-numbered order or even-numbered order so as to send odd-numbered order signals to an input terminal $Q_1$ of the RADF signal producer 443 and even-numbered order signals to an input terminal $Q_2$ of the RADF signal producer 443.

The RADF signal producer 443, when receiving the ADF change signal at the input terminal $Q_1$, allows it to directly pass through the terminal. When receiving the ADF change signal at the input terminal $Q_2$, the RADF signal producer 443 delays its output from the terminal for a predetermined period of time. When receiving the ADF change signal at the input terminal $Q_3$, the RADF signal producer 443 allows it to directly pass through the terminal The above-mentioned predetermined delay time is set at, for example, a width of the ADF change signal from an output terminal $Q_2$.

A signal issued by the RADF signal producer 443 is sent through a gate 444 to the RADF control unit 40 as a RADF signal. The gate 444 prevents signals from passing when the last document is detected.

Document feeding and discharging operations which the above-mentioned circuit executes in the RADF mode will be described below with reference to FIGS.1 and 9. It should be noted that in this case, the forced switch 43 is set in an ON-start to cause ADF control signals from the control unit 41 to send to the RADF forced circuit 44 only.

When a copy starting button is turned on after a document is set in position, the main body of the copying machine sends an ADF starting signal. Then, the RADF forced circuit 44 sends an ADF.START signal from the discrimination circuit 441 and at the same time sends a RADF signal from the gate 444. Both signals start RADF mode operation. Specifically, the first document of a stack of documents is conveyed to the conveyor belt a, which conveys the document to a document reversing mechanism 7 without stopping over a contact glass 1. At this time, the change guide plate 18 has been changed to the position indicated by solid lines in FIG.1. The document is consequently conveyed through passages 19, 20, 21, 22, 23, 24 and 25 to the conveyor belt 8, which has already been changed so as to move in the opposite direction. Accordingly, the document is fed in the reverse direction. In other words, the document is reversed by the document reversing passages. Consequently, the document is conveyed in a reversed state to the contact glass 1. Accordingly, a back surface of the document is first copied This corresponds to operation illustrated in FIG.9 (a).

When the copying of the back surface is completed, the main body of the copying machine sends a first ADF change signal or an odd-numbered order ADF change signal. Then, the RADF forced circuit 44 sends a CHANGE signal from the discrimination circuit 441 and at the same time a RADF signal from the gate 444. Both signals execute reversing operation of RADF. Specifically, the conveyor belt 8 is actuated again to convey the document to the document reversing mechanism 7. Further, the document is passed through the document reversing passages, then being conveyed to the contact glass 1 by the conveyor belt 8 driven in the opposite direction in the same manner as described above. Thereafter, the front surface of the document is copied. This corresponds to an operation illustrated in FIG.9 (b).

When the copying of the front surface is completed, the main body of the copying machine sends the next or an evennumbered order ADF change signal. Then, the RADF forced circuit 44 sends a CHANGE signal from the discrimination circuit 441 and a RADF signal delayed for a predetermined period of time after the CHANGE signal from the gate 444. Both signals execute continuous operation of RADF which is different from the operation illustrated in FIG.9 (b). Specifically, the conveyor belt 8 operates in the same manner as described above in response to the CHANGE signal. At this time, however, the RADF control unit 40 has not yet received the RADF signal. Consequently, the change guide plate 18 is changed to the position indicated by two-dot chain lines in FIG.1. Accordingly, an document conveyed to the document reversing mechanism 7 is discharged to the discharge tray 39 while the next document is conveyed in the reversed state to the contact glass 1 as illustrated in FIG. 9 (a). This corresponds to the operation illustrated in FIG.9 (c).

Thereafter, each time the RADF forced circuit 44 sends an ADF change signal, the reversing operation illustrated in FIG.9 (b) and the continuous operation illustrated in FIG.9 (c) are performed alternately.

When the last document is detected, the gate 444 is shut off. As a result, when the main body of the copying machine sends an ADF change signal thereafter, the RADF forced circuit 44 sends only a CHANGE signal from the discrimination circuit 441. Consequently, the change guide plate 18 is changed to the position indicated by two-dot chain lines in FIG.1. Accordingly, a document conveyed to the document reversing mechanism 7 is discharged to the discharge tray 39. This corresponds to an operation illustrated in FIG.9 (d).

As described above, in a reversible auto document feeder of the present invention which is provided with a RADF forced circuit and a forced switch, the selection of ADF and RADF is carried out not by a signal from a main bOdy of a copying machine, but by a change switch provided in the reversible auto document feeder. Specifically, when the forced switch is set in OFF-state, the reversible auto document feeder of the present invention performs ADF in accordance with an ADF signal from the main body of the copying machine. When the forced switch is set in an ON-state, the reversible auto document feeder forcedly performs RADF even when receiving an ADF signal from the main body of the copying machine. Accordingly, it will be apparent that even when being applied for image forming apparatus having only the function of sending an ADF control signal, such as extensively used single-side machines, a reversible auto document feeder of the present invention can perform its originally designed RADF function.

What is claimed is:

1. An improved reversible auto document feeder removably mountable on a conventional image forming apparatus of the single side type which produces an automatic document feeder ADF signal which is useable to provide single side copying only using a conventional document feeder, the improved reversible auto document feeder being operable to use said ADF signal and enable said improved reversible auto document feeder to effect double sided copying, said improved reversible auto document feeder comprising a document feed mechanism having a first single side copying mode which includes feeding the document to a document placing position on said image forming apparatus and then discharging the document, said document feed mechanism receiving said ADF signal from said image forming apparatus to effect operation of said document feed mechanism according to said first single side copying mode, said document feed mechanism having a second double sided copying mode which includes feeding a document to said document placing position on said image forming apparatus, reversing the document, feeding the reversed document to said document placing position again, and discharging the document; and a change switch means provided on the improved reversible auto document feeder operable to selectively change operation of said document feed mechanism between said first and second copying modes, said change switch means comprising control means receiving said ADF signal from said conventional image forming apparatus and providing a reverse automatic document feed RADF signal for effecting operation of said document feed mechanism according to said second copying mode to thereby effect double sided copying.

2. A reversible auto document feeder according to claim 1, wherein said single side copying mode is a normal operational mode and said second double sided copying mode is a forced operational mode which is forcibly effected by manually operating said change switch means.

* * * * *